May 19, 1959 — F. K. H. NALLINGER — 2,887,101
INTERNAL COMBUSTION ENGINE
Original Filed June 28, 1951 — 2 Sheets-Sheet 1

INVENTOR.
FRIEDRICH K. H. NALLINGER
BY Dicke and Craig
ATTORNEYS

INVENTOR.
FRIEDRICH K. H. NALLINGER
BY Dicke and Craig
ATTORNEYS

United States Patent Office 2,887,101
Patented May 19, 1959

2,887,101

INTERNAL COMBUSTION ENGINE

Friedrich K. H. Nallinger, Stuttgart, Germany, assignor to Daimler-Benz Aktiengesellschaft, Stuttgart-Unterturkheim, Germany Original application June 28, 1951, Serial No. 234,052, now Patent No. 2,757,655, dated August 7, 1956. Divided and this application June 21, 1956, Serial No. 602,948

Claims priority, application Germany June 28, 1950

12 Claims. (Cl. 123—191)

This invention relates to internal combustion engines having the intake and exhaust valves arranged in the cylinder head. Such type of engine has the advantage that a higher compression ratio and higher speed and thus an increased final output can more easily be obtained. On the other hand, the accommodation of sufficiently large valves meets with difficulties.

The present application is a divisional application of the copending application Serial No. 234,052 filed on June 28, 1951 and now Patent No. 2,757,655.

One object of the present invention is to provide an arrangement of inverted valves in the cylinder head with which, with a view to obtain high engine outputs, the valves, on the one hand, may be given sufficiently large dimensions practically independently of the cylinder diameter and, at the same time, a cylinder head is provided which is simple to manufacture.

A further object of the present invention is the provision of an engine construction in which the cylinder and cylinder head castings are of simple construction so as to permit the surfaces and holes which have to be machined to be arranged in either perpendicular or parallel relationship to each other.

A still further object of the invention is to provide an arrangement in which the pistons are so designed as to offer the combustion chamber the least possible surface for the input of heat.

One feature of the present invention accordingly consists in that the one of the two valves is arranged within or substantially within the cylinder periphery, the other valve being arranged inversely in a position receded with relation to the first valve and conveniently parallel thereto within a combustion space partially projecting beyond the cylinder periphery and substantially constituting the main combustion chamber. According to a further feature of the present invention the walls of the cylinder head limiting the cylinder space and containing the first mentioned valve are so arranged that in the upper dead center position of the piston the piston head closely approaches said valve.

Some embodiments of the present invention are illustrated by way of example in the accompanying drawings in which.

Figure 1:
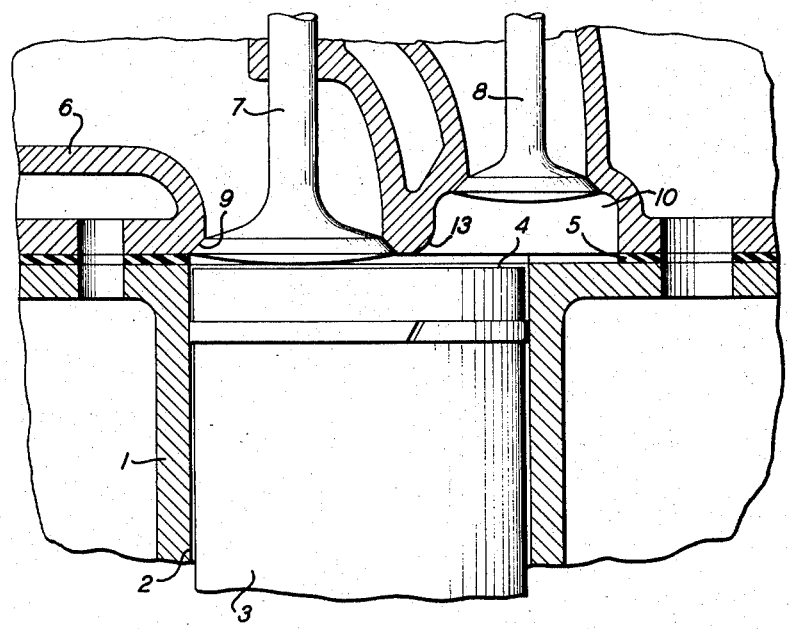
Fig. 1 is a fragmentary vertical section of one engine cylinder.

In the cylinder bore 2 of the water-cooled cylinder casting 1 a piston 3 having a plane piston head 4 is mounted for reciprocation therein in such a manner that the piston head is approximately flush with the joint 5 between engine cylinder and cylinder head 6 in the upper dead center position of the piston 3.

The cylinder head 6 which may be of grey cast iron or light alloy and water-cooled just as the engine cylinder 1 contains the two valves 7 and 8, valve 7 which is preferably the intake valve is immediately adjacent the joint 5 constituting the plane bottom side of the cylinder head so that in the upper dead center position of the piston 3 the piston head surface 4 closely approaches the intake valve 7. If it is desired to open the intake valve already prior to the beginning of the suction stroke in the upper dead center position of the piston 3, then the valve seating 9 may also be receded with respect to the joint 5 by a corresponding amount.

The vale 8 which is preferably the exhaust valve is located in the upper limiting wall of a combustion chamber pocket 10 which, as seen in a plan view approximately tangentially joins or passes over into the periphery of the engine cylinder, at least with the extension of the side walls thereof and which projects beyond the periphery of the engine cylinder and is defined or limited on its bottom side by the joint 5. The spark plug or plugs, and in the case of an injection-type engine, for instance, also the injection nozzle or nozzles, conveniently are located in the combustion chamber pocket 10 and preferably, as shown in Fig. 2, at the point 11 or, as shown in Figure 4, at the point 12 adjacent the valve 8 so that, as seen in a plan view, they are placed within the inner periphery of the engine cylinder and consequently at points where the charge displaced from the side of the intake valve 7 out of the cylinder space passes into the combustion chamber pocket 10.

It will be obvious that the invention permits to provide intake and exhaust valves of any desired size independently of the cylinder diameter. In the embodiment shown, the intake valve 7 is arranged wholly within the inner periphery of the cylinder whereas this is the case with the exhaust valve 8 only with approximately one half of its valve face. At the transition point 13 of the wall surface of the cylinder head containing the intake valve 7 and causing a displacing action in the direction toward the combustion chamber pocket, the wall of the cylinder head may be rounded in such a manner as to permit during the compression stroke an inflow into the combustion chamber pocket 10 which is as free as possible from losses and during the working stroke of the engine an outflow equally as free as possible from losses.

Figure 2:
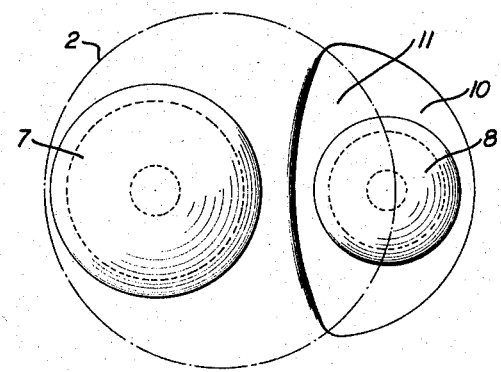
Fig. 2 is an inverted plan view showing the arrangement of the valves in the cylinder head.
Figure 3:
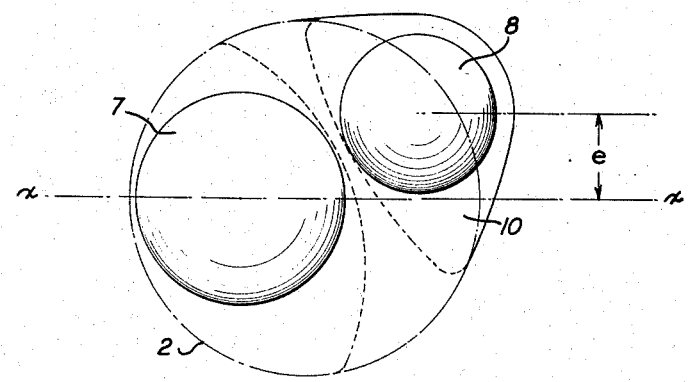
Figs. 3 and 4 show two modified forms of construction in a plan view similar to Fig. 2.
Figure 4:
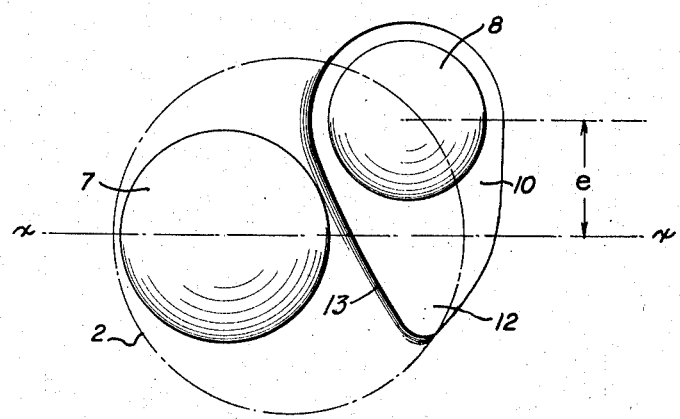

The examples of construction shown in Figs. 3 and 4 differ from that of Fig. 2 substantially only in that the valves 7 and 8 are arranged offset with respect to the axis $x$—$x$ and in particular to a transverse axis extending perpendicularly to the longitudinal axis of the engine, for instance, by the amount $e$. The accommodation of the valve timing means will thereby be facilitated and simplified. Whilst in the example of construction shown in Fig. 3 the combustion chamber pocket 10 is designed symmetrically with respect to valve 8, it is arranged unilaterally or asymmetrically thereto in the example of construction according to Fig. 4. In this case the spark plug or injection nozzle may be appropriately located at point 12, as mentioned hereinabove. The conformation of the combustion chamber pocket 10 in Fig. 4 further permits to obtain a rotary movement of the air entering the pocket. It will be obvious that the valve 7 may also be arranged offset with respect to the transverse axis $x$—$x$, for instance, at the side of this axis opposite the valve 8.

For the rest the same refers to the embodiments according to Figs. 3 and 4 as for the embodiment shown in Figs. 1 and 2.

While this description has reference to particular forms of the invention it will be obvious that various other forms and modifications may be resorted to without departing from the scope of the invention.

What I claim is:

1. An internal combustion engine comprising a cylinder block housing having at least one cylinder, a cylinder head separated from said cylinder block by a plane separating joint, an off-set combustion chamber in said cylinder head limited at the bottom thereof by said separating joint and located laterally with respect to the cylinder axis on the side of said separating joint opposite said cylinder, the extent of said combustion chamber in the circumferential direction of said cylinder being larger than the radial width thereof and said combustion chamber comprising a curved outer wall portion with the center of curvature thereof displaced laterally with respect to the cylinder axis, said curved outer wall portion passing over into the periphery of said cylinder nearly tangentially at least with the extension thereof and at one end thereof, one considerable portion of said combustion chamber lying within the cylinder periphery and a considerable portion thereof lying beyond said cylinder periphery, and a first valve located in said combustion chamber with the axis thereof located in the vicinity of the periphery of said cylinder and extending over nearly the entire radial dimension of said combustion chamber.

2. An internal combustion engine comprising a cylinder block housing having at least one cylinder, a cylinder head separated from said cylinder block by a plane separating joint, an off-set combustion chamber in said cylinder head limited at the bottom thereof by said separating joint and located laterally with respect to the cylinder axis on the side of said separating joint opposite said cylinder, the extent of said combustion chamber in the circumferential direction of said cylinder being larger than the radial width thereof and said combustion chamber comprising a curved outer wall portion with the center of curvature thereof displaced laterally with respect to the cylinder axis, said curved outer wall portion passing over into the periphery of said cylinder nearly tangentially at least with the extension thereof and at one end thereof, a considerable portion of said combustion chamber lying within the cylinder periphery and another considerable portion thereof lying beyond said cylinder periphery, a first valve located in said combustion chamber with the axis thereof located in the vicinity of the periphery of said cylinder and extending over nearly the entire width of said combustion chamber in the radial direction of said cylinder, and a second valve in said cylinder head of diametric dimension greater than the radial dimension of said cylinder and with the axis thereof located on the side opposite said combustion chamber relative to the cylinder axis, whereby both valves are of relatively large cross section.

3. An internal combustion engine as defined in claim 1, wherein the radial width of said combustion chamber is substantially smaller than the length of said outer wall portion, and wherein the height of said combustion chamber in the direction of the cylinder axis is substantially smaller than said radial width.

4. An internal combustion engine, as defined in claim 2, wherein the surface of the cylinder head limiting the cylinder lies substantially in said separating joint, and wherein the head of said second valve, as seen in the direction of the cylinder axis, is located in the surface of said cylinder head wholly within the cylinder periphery and extends merely from the inner wall of said combustion chamber to the opposite side of the cylinder periphery.

5. An internal combustion engine as defined in claim 1, further comprising ignition means asymmetrically arranged in said combustion chamber within the inner periphery of said engine cylinder.

6. An internal combustion engine as defined in claim 1, wherein the piston is provided with a plane piston head closely approaching the plane of said separating joint in the upper piston dead center, and wherein the lower edge of the wall defining the combustion chamber within the cylinder periphery is rounded off to facilitate inflow of the combustion charge into said combustion chamber during the compression stroke and to facilitate outflow of the charge during the working stroke of the engine.

7. In an internal combustion engine as defined in claim 1, wherein said combustion chamber is asymmetrically shaped so as to obtain a rotary movement of the combustion air entering said combustion chamber at said one end thereof.

8. An internal combustion chamber comprising a cylinder block housing having at least one cylinder, a cylinder head separated from said cylinder block by a plane separating joint, an asymmetric combustion chamber in said cylinder head defined by said separating joint and located laterally with respect to the cylinder axis on the side of said separating joint opposite said cylinder, said combustion chamber comprising a curved outer wall portion having a radius of curvature of lesser dimension than the radius of said cylinder with the center thereof displaced laterally with respect to the cylinder axis, said curved outer wall portion passing over into the periphery of said cylinder nearly tangentially at least with the extension thereof, essentially one-half of the radial dimension of said combustion chamber lying within the cylinder periphery and essentially one-half of the radial dimension lying beyond said cylinder periphery, a first valve located in said combustion chamber with the axis thereof lying in the vicinity of the periphery of the cylinder, said first valve extending over nearly the entire radial dimension of said combustion chamber, a second valve in said cylinder head of diametric dimension greater than the radial dimension of said cylinder and with the axis thereof located in said cylinder head on the side opposite said combustion chamber relative to the cylinder axis.

9. An internal combustion chamber comprising a cylinder block housing having at least one cylinder, a cylinder head separated from said cylinder block by a plane separating joint, a combustion chamber in said cylinder head open to and limited by said joint and arranged laterally with respect to the cylinder axis, said combustion chamber extending partially beyond the cylinder periphery and having a concavely curved surface of asymmetrical shape defining the outer wall of said combustion chamber and including a curved wall portion having a radius of curvature, said outer wall forming the largest dimension of said combustion chamber, the radius of said curved wall portion of said combustion chamber being essentially one-half said largest dimension and the height of said combustion chamber in the direction of the cylinder axis being essentially one-half said radius, said radius extending, as seen in a plan view in the direction of the cylinder axis, essentially one-half within the cylinder periphery and essentially one-half beyond said periphery, a first valve in the cylinder head above the cylinder on the side of said cylinder axis opposite said combustion chamber and a second valve in said combustion chamber arranged with the axis thereof near the cylinder periphery, both valves being arranged in an inverted position parallel to the cylinder axis.

10. An internal combustion chamber comprising a cylinder block housing having at least one cylinder, a cylinder head separated from said cylinder block by a plane separating joint, a combustion chamber in said cylinder head open to and limited by said joint and arranged laterally with respect to the cylinder axis, said combustion chamber extending partially beyond the cylinder periphery and having a curved surface of asymmetrical contour defining the outer wall of said combustion chamber and including a curved rear wall portion having a radius of curvature, said outer wall forming the largest dimension of said combustion chamber, the radius of said curved wall portion of said combustion chamber being substantially smaller than said largest dimension and the height of said combustion chamber in the direction of the cylinder axis being substantially smaller than said radius, said radius extending, as seen in a plan view in the direction of the cylinder axis, to a considerable extent within the cylinder periphery and to a considerable extent beyond said periphery, a first valve in said cylinder head above the cylinder on the side of said cylinder axis opposite said combustion chamber, and a second valve in the cylinder head in said combustion chamber arranged with the axis thereof near the cylinder periphery, both valves being arranged in an inverted position parallel to the cylinder axis.

11. An internal combustion engine comprising a cylinder block having at least one cylinder, a cylinder head separated from said cylinder block by a separating gap, an off-set combustion chamber projecting with nearly one-half thereof beyond the cylinder periphery, said off-set combustion chamber being extended in the circumferential direction of said cylinder so as to extend nearly over the diameter of said cylinder whereas the largest width in a radial direction of said cylinder amounts only to about one-half said cylinder diameter, said combustion chamber including a curved rear wall which passes over into the cylinder periphery about tangentially with an extension thereof and being limited at the bottom side thereof by said separating gap, a first valve arranged over the non-set-off portion of said cylinder head, and a second valve arranged in said off-set combustion chamber, both said valves having a relatively very large cross section with one of said valves extending nearly over a radial width from the cylinder periphery to said off-set combustion chamber and the other valve over the width of said combustion chamber, and the axis of said first valve being disposed near said cylinder periphery.

12. An internal combustion engine comprising a cylinder block housing having at least one cylinder, a cylinder head separated from said cylinder block by a plane separating joint, an offset combustion chamber in said cylinder head limited at the bottom thereof by said separating joint and located laterally with respect to the cylinder axis on the side of said separating joint opposite said cylinder, the extent of said combustion chamber in the circumferential direction of said cylinder being larger than the radial width thereof and said combustion chamber comprising a curved outer wall portion with the center of the curvature thereof displaced laterally with respect to the cylinder axis, said curved outer wall portion passing over into the periphery of said cylinder nearly tangentially at least with the extension thereof and at one end thereof, while the other end thereof passes over into the periphery of said cylinder in non-tangential relationship under a substantial angle, one considerable portion of said combustion chamber lying within the cylinder periphery and a considerable portion thereof lying beyond said cylinder periphery, and a first valve located in said combustion chamber with the axis thereof located in the vicinity of said periphery of said cylinder and extending over nearly the entire radial dimension of said combustion chamber.

References Cited in the file of this patent

UNITED STATES PATENTS

| | | |
|---|---|---|
| 1,887,897 | Whatmough | Nov. 15, 1932 |
| 1,972,409 | Petersen | Sept. 4, 1934 |
| 1,986,418 | Smith | Jan. 1, 1935 |
| 2,094,893 | Jacoby | Oct. 5, 1937 |
| 2,126,939 | Winfield | Aug. 16, 1938 |
| 2,133,592 | Taub | Oct. 18, 1938 |
| 2,214,941 | Taub | Sept. 17, 1940 |

FOREIGN PATENTS

| | | |
|---|---|---|
| 758,907 | France | Nov. 7, 1943 |
| 444,778 | Italy | Jan. 28, 1949 |